US010310729B2

(12) United States Patent
Kondo

(10) Patent No.: US 10,310,729 B2
(45) Date of Patent: Jun. 4, 2019

(54) MOBILE ELECTRONIC APPARATUS AND DISPLAY METHOD

(71) Applicant: KYOCERA CORPORATION, Kyoto (JP)

(72) Inventor: Masuo Kondo, Neyagawa (JP)

(73) Assignee: KYOCERA CORPORATION, Kyoto (JP)

(*) Notice: Subject to any disclaimer, the term of this patent is extended or adjusted under 35 U.S.C. 154(b) by 272 days.

(21) Appl. No.: 15/247,629

(22) Filed: Aug. 25, 2016

(65) Prior Publication Data

US 2017/0060375 A1 Mar. 2, 2017

(30) Foreign Application Priority Data

Aug. 28, 2015 (JP) .................................. 2015-169644

(51) Int. Cl.
G06F 3/048 (2013.01)
G06F 3/0488 (2013.01)
G06F 3/041 (2006.01)
G06F 3/0484 (2013.01)
G06F 3/01 (2006.01)

(52) U.S. Cl.
CPC ............ *G06F 3/0488* (2013.01); *G06F 3/016* (2013.01); *G06F 3/0416* (2013.01); *G06F 3/04847* (2013.01)

(58) Field of Classification Search
CPC .. G06F 21/562; G06F 3/04812; G06F 3/1285; G06F 3/0482; G06F 3/04847; G06F 3/1219; G06F 8/38; G06F 17/30864; G06F 17/30905; G06F 3/0486; G06F 3/1256; G06F 9/4443; G06F 9/451; G06F 17/2235; G06F 17/2247; G06F 17/30551; G06F 17/3089

See application file for complete search history.

(56) References Cited

U.S. PATENT DOCUMENTS 8,525,854 B2 9/2013 Murakami
2012/0042289 A1* 2/2012 Cragun ............. G06F 17/30905
715/865

(Continued)

FOREIGN PATENT DOCUMENTS

JP 2004-295722 10/2004
JP 2011-186734 9/2011

(Continued)

*Primary Examiner* — Di Xiao
(74) *Attorney, Agent, or Firm* — Duane Morris LLP

(57) ABSTRACT

A receiver receives a second webpage including a link destination indicating a first webpage. A display displays the second webpage. A touch sensor detects a user's touch operation on the display. The at least one processor changes a display size of the second webpage displayed on the display based on a first touch operation by the user. The at least one processor displays the first webpage on the display upon detection of a second touch operation performed on the link destination displayed on the display when the second webpage is displayed in a first display size. The at least one processor does not display the first webpage on the display upon detection of the second touch operation performed on the link destination displayed on the display when the second webpage is displayed in a second display size larger than the first display size.

19 Claims, 10 Drawing Sheets

(56) References Cited

U.S. PATENT DOCUMENTS

| | | | | |
|---|---|---|---|---|
| 2012/0060114 A1* | 3/2012 | Chung | ............... | H04N 21/4438 |
| | | | | 715/800 |
| 2013/0055140 A1* | 2/2013 | Mosquera | ............. | G06F 3/0483 |
| | | | | 715/776 |
| 2015/0248389 A1* | 9/2015 | Kahn | .................... | G06F 17/241 |
| | | | | 715/230 |

FOREIGN PATENT DOCUMENTS

| | | |
|---|---|---|
| JP | 2013-101547 | 5/2013 |
| JP | 2013-117858 | 6/2013 |

* cited by examiner

F I G. 1
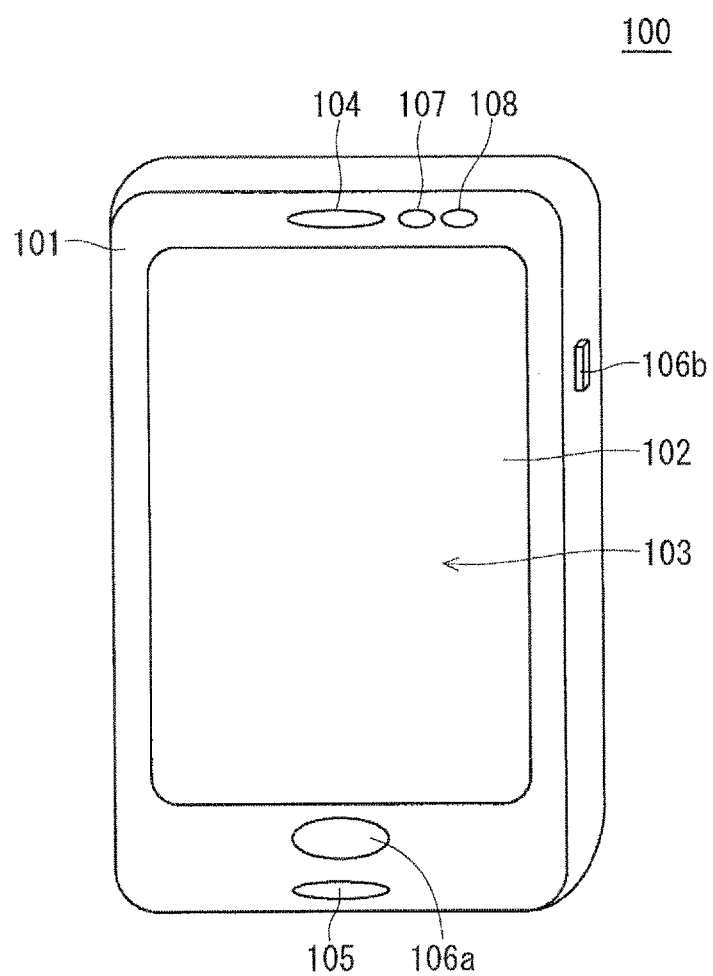

MOBILE ELECTRONIC APPARATUS AND DISPLAY METHOD

CROSS-REFERENCE TO RELATED APPLICATION

The present application claims priority under 35 U.S.C. § 119 to Japanese Patent Application No. 2015-169644, filed on Aug. 28, 2015, entitled "MOBILE ELECTRONIC APPARATUS". The content of which is incorporated by reference herein in its entirety.

FIELD

Embodiments of the present disclosure relate to a mobile electronic apparatus.

BACKGROUND

There are known electronic apparatuses such as smartphones that have a configuration in which a touch panel is disposed on a front surface of a display.

SUMMARY

A mobile electronic apparatus and a display method are disclosed. In one embodiment, a mobile electronic apparatus comprises a receiver, a display, a touch sensor, and at least one processor. The receiver receives a first webpage including a link destination indicating a second webpage. The display displays the first webpage. The touch sensor detects a touch operation of a user on the display. The at least one processor changes a display size of the first webpage displayed on the display based on a first touch operation by the user. The at least one processor displays the first webpage on the display upon detection of a second touch operation performed on the link destination displayed on the display when the first webpage is displayed in a first display size. The at least one processor does not display the first webpage on the display upon detection of the second touch operation performed on the link destination displayed on the display when the first webpage is displayed in a second display size larger than the first display size.

In one embodiment, a mobile electronic apparatus comprises a storage, a display, a touch sensor, and at least one processor. The storage stores first information and a predetermined process in association with each other. The display displays second information including the first information. The touch sensor detects a touch operation of a user performed on the display. The at least one processor changes a display size of the second information displayed on the display based on a first touch operation by the user. The at least one processor executes the predetermined process upon detection of a second touch operation performed on the first information displayed on the display when the second information is displayed in a first display size. The at least one processor does not execute the predetermined process upon detection of the second touch operation performed on the first information displayed on the display when the second information is displayed in a second display size larger than the first display size.

In one embodiment, a display method comprises displaying first information including second information on a display. The second information and a predetermined process are in association with each other. A touch operation of a user performed on the display is detected. A display size of the first information displayed on the display is changed based on a first touch operation by the user. The predetermined process is executed upon detection of a second touch operation performed on the second information displayed on the display when the first information is displayed in a first display size. The predetermined process is not executed upon detection of the second touch operation performed on the second information displayed on the display when the first information is displayed in a second display size larger than the first display size.

BRIEF DESCRIPTION OF THE DRAWINGS

FIG. 1 illustrates an external perspective view of a mobile phone.

DETAILED DESCRIPTION

Figure 2:
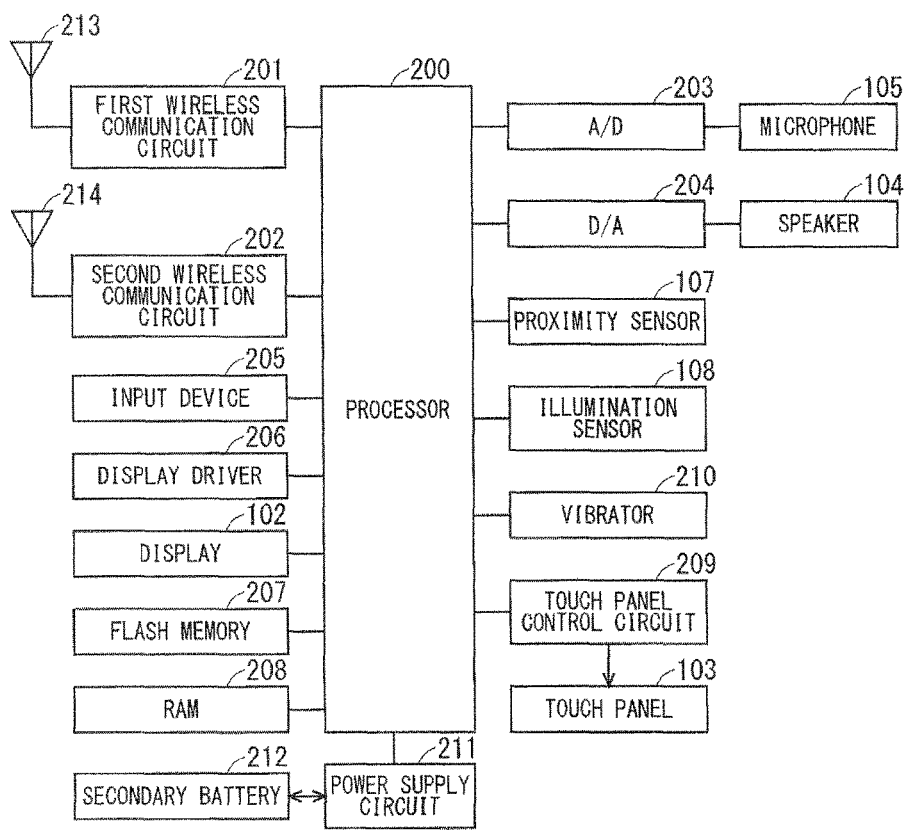
FIG. 2 illustrates a configuration diagram of the mobile phone.

The following will describe a mobile phone 100 as a mobile electronic apparatus according to an embodiment of the present disclosure.

<Configuration of Mobile Phone 100>

The mobile phone 100 illustrated in FIG. 1 is, for example, a smartphone. The smartphone includes a vertically long, flat, and rectangular housing 101. An embodiment disclosed herein is not applicable only to the smartphone but to appropriate mobile electronic apparatuses such as tablet devices, tablet PCs, and personal digital assistants (PDAs).

On a main surface (front surface) of the housing 101 is provided a display 102 that comprises, for example, liquid crystal or organic electroluminescence (EL) and functions as a display unit. On the display 102 may be provided a touch panel 103. A part of the touch panel 103 may be embedded in the display 102.

A built-in speaker 104 is located at a vertical end of the housing 101 on the main surface of the housing 101. A built-in microphone 105 is located at the other vertical end of the housing 101 on the main surface.

For example, a menu key 106a and a power supply key 106b are provided in the mobile phone 100 as hard keys. The hard keys are included in an input device 205 together with the touch panel 103. The menu key 106a is located on the main surface of the housing 101. The power supply key 106b is located on a side surface of the housing 101.

Additionally, a proximity sensor 107 and an illumination sensor 108 are provided adjacent to the speaker 104. The detection surface of the proximity sensor 107 and the detection surface of the illumination sensor 108 are provided so as to be exposed from the housing 101, and the other portions thereof are built in the housing 101.

For example, the user can perform a touch operation on a dial pad displayed on the display 102 to input a telephone number. The user can then perform a touch operation on an incoming call key (not shown) displayed on the display 102 to start a voice call.

Upon start of a voice call, a call end key is displayed on the display 102, and when a touch operation is performed on the call end key, a voice call ends.

When the menu key 106*a* is operated, a home screen appears on the display 102. The user can perform a touch operation on a graphical user interface (GUI) such as icons and keys displayed on the display 102 to select, for example, icons and keys, thus confirming the selection.

The user can power on and/or off the mobile phone 100 through a long press of the power supply key 106*b*. The display 102 and the touch panel 103 are powered off through a short press of the power supply key 106*b* with a screen displayed on the display 102.

The GUI such as icons and soft keys displayed on the display 102 may be collectively referred to as an object in the description below.

The touch operation is an operation including a finger touch (contact) with the surface of the touch panel 103. Examples of the touch operation include a tap operation, a long tap operation, a flick operation, and a swipe (slide) operation.

The tap operation is an operation of bringing a finger into contact (touch) with the surface of the touch panel 103 and, in a short period of time, releasing the finger from the surface of the touch panel 103. The long tap operation is an operation of keeping a finger in contact with the surface of the touch panel 103 for a predetermined period of time or longer, and then, moving the finger off the surface of the touch panel 103. The flick operation is an operation of bringing a finger into contact with the surface of the touch panel 103 and moving the finger off the surface while flicking the finger at a predetermined speed or higher in an appropriate direction. The swipe (slide) operation is an operation of moving a finger in an appropriate direction while keeping the finger in contact with the surface of the touch panel 103, and then, moving the finger off the surface of the touch panel 103.

Examples of the swipe operation include an operation of bringing a finger into contact with an object displayed on the surface of the display 102 and moving the object and an operation of moving a finger in an appropriate direction while keeping the finger in contact with the surface of the touch panel 103 without moving the object. The operation of moving an object of the examples of the swipe operation is also referred to as a drag operation. The operation of moving an object through a drag operation and then moving a finger off the surface of the touch panel 103 is also referred to as a drop operation. For example, the position of the object after moving is determined through a drop operation, and an object is displayed at the position at which finger is moved off.

In the description below, the tap operation, long tap operation, flick operation, swipe operation, drag operation, and drop operation may also be described without "operation". The touch operation may be performed not only with a user's finger but also with, for example, a stylus pen.

With reference to FIG. 2, the mobile phone 100 illustrated in FIG. 1 includes at least one processor 200 for providing control and processing capability to perform various functions as described in further detail below. In accordance with various embodiments, the at least one processor 200 may be implemented as a single integrated circuit (IC) or as multiple communicatively coupled IC's and/or discrete circuits. It is appreciated that the at least one processor 200 can be implemented in accordance with various known technologies.

In one embodiment, the processor 200 includes one or more circuits or units configurable to perform one or more data computing procedures or processes. For example, the processor 200 may include one or more processors, controllers, microprocessors, microcontrollers, application specific integrated circuits (ASIs), digital signal processors, programmable logic devices, field programmable gate arrays, or any combination of these devices or structures, or other known devices and structures, to perform the functions described herein. Although the mobile phone 100 includes one processor 200 in one embodiment, it may include a plurality of processors 200.

The processor 200 is connected with, for example, the proximity sensor 107, the illumination sensor 108, a first wireless communication circuit 201, a second wireless communication circuit 202, an A/D converter 203, a D/A converter 204, an input device 205, a display driver 206, a flash memory 207, a RAM 208, a touch panel control circuit 209, a vibrator 210, and a power supply circuit 211. The processor 200 may also be referred to as a controller.

The processor 200 can perform overall control of the mobile phone 100. In the RAM 208 that is a storage, all or some of the programs preset in the flash memory 207 are expanded in use, and the processor 200 can operate in accordance with the programs on the RAM 208. The various functions of the processor 200 are implemented by the processor 200 operating in accordance with the program on the RAM 208. The RAM 208 is further used as a working region or buffer region of the processor 200. All or some of the functions of the processor 200 may be configured as a hardware circuit that needs no software to perform the functions thereof. The processor 200 will be described below in detail.

The input device 205 includes hard keys illustrated in FIG. 1. The input device 205 can thus accept key operations performed on the hard keys. When accepting the input operation performed on the hard key, the input device 205 can input the information on the hard key (key data) into the processor 200.

The first wireless communication circuit 201 is a circuit for transmitting and receiving radio waves for voice calls and emails through an antenna 213. The first wireless communication circuit 201 is, for example, a circuit for wireless communications based on Code Division Multiple Access (CDMA) scheme. In one example, based on an outgoing call (voice transmission) operation accepted by the touch panel 103, the first wireless communication circuit 201 can execute a voice transmission process under the instruction of the processor 200 and output a voice transmission signal through the antenna 213. The voice transmission signal is transmitted to a partner telephone via a base station and a communication network. When the partner telephone performs a voice reception process, a communicable state is established, so that the processor 200 executes a call process.

The second wireless communication circuit 202 is a circuit for transmitting and receiving data to and from the server through an antenna 214. The second wireless communication circuit 202 is, for example, a circuit for wireless communications based on Long Term Evolution (LTE) scheme. In one example, based on the operation accepted by the touch panel 103, the second wireless communication circuit 202 can transmit information such as a uniform resource locator (URL) to the server through the antenna 214 and receive the information about a webpage from the server under the instruction of the processor 200. The received webpage-related information is displayed on the display 102. If the displayed webpage includes link information, when the user performs a touch operation on the link information, the second wireless communication circuit 202 can transmit the information included in the link information to the server through the antenna 214 under the instruction of the processor 200. The second wireless communication circuit 202 can then receive the information about a webpage that is a link destination from the server. The received information about the webpage that is a link destination is displayed on the display 102. Alternatively, the second wireless communication circuit 202 may perform wireless communications based on, for example, the Wireless Fidelity (WiFi) scheme in addition to the wireless communications based on the LTE scheme.

The A/D converter 203 is connected with the microphone 105 illustrated in FIG. 1. As described above, a voice signal from the microphone 105 is converted into digital voice data by the A/D converter 203, and the voice data is input to the processor 200. The D/A converter 204 is connected with the speaker 104 illustrated in FIG. 1. The D/A converter 204 can convert the digital voice data into a voice signal and output it to the speaker 104 via an amplifier. The voice based on the voice data is thus output from the speaker 104. While the call process is being executed, the voice picked up by the microphone 105 is transmitted to a partner telephone, and the voice picked up by the partner telephone is output from the speaker 104.

The display driver 206 is connected with the display 102 illustrated in FIG. 1. The display 102 can thus display a video or an image in accordance with the video or image output from the processor 200. The display driver 206 may include a video memory for temporarily storing image data to be displayed. The data output from the processor 200 is stored in the video memory. The display driver 206 can then display an image on the display 102 in accordance with the contents of the video memory. In other words, the display driver 206 can control a display of the display 102 connected to the display driver 206 under the instruction of the processor 200. The processor 200 may thus be referred to as a display controller. The display 102 may be provided with a backlight, and the display driver 206 can control the brightness of the backlight and turn-on/turn-off of the backlight in accordance with the instruction of the processor 200.

The touch panel control circuit 209 is connected with the touch panel 103 illustrated in FIG. 1. The touch panel control circuit 209 can provide a necessary voltage or the like to the touch panel 103 and also input, to the processor 200, a touch start signal indicating the start of a touch and an end signal indicating the end of a touch, which are performed on the touch panel 103, and can coordinate data indicating a position of the touch. The processor 200 can thus judge an object that has been touched based on the coordinate data and a change in the coordinate data.

For example, the touch panel 103 is a capacitive touch panel 103 for detecting a change in the electrostatic capacitance generated between its surface and an object such as a finger (hereinafter collectively referred to as a finger for convenience' sake). The touch panel 103 can detect that, for example, one or more fingers have touched the touch panel 103. The touch panel 103 may thus be referred to as a pointing device. The touch panel control circuit 209 can detect a touch within a touch effective range of the touch panel 103 and output the coordinate data indicating the position of the touch to the processor 200. In other words, the user can perform a touch operation on the surface of the touch panel 103 to input an operation position, an operation direction, and the like to the mobile phone 100. The touch panel control circuit 209 can also detect an amount of change in the electrostatic capacitance in the touch operation performed on the touch panel 103. Although description is given using a capacitive touch panel in one embodiment, the touch panel is not limited to the capacitive touch panel. For example, a pressure-sensitive touch panel may be used that detects a change in pressure generated by an object such as a finger pressing the surface of the touch panel. The above-mentioned touch operations, such as the tap operation, long tap operation, flick operation, and swipe (slide) operation can be achieved with the use of a pressure-sensitive touch panel.

In the touch panel 103, a high sensitivity mode can be set in which a touch can be detected by the user even with a gloved hand. Specifically, a mode is set automatically in accordance with an amount of change in electrostatic capacitance of a first touch in start of the touch operation. For example, if an amount of change in electrostatic capacitance is smaller than a threshold (first threshold), it is judged that a touch is made with a glove, and a setup value for determining that a touch has been made is set to a value smaller than a normal setup value. The state in which the setup value for determining that a touch has been made is set to a value smaller than a normal setup value is referred to as a high sensitivity mode. In contrast, the state in which the setup value for determining that a touch has been made is set to a normal setup value is referred to as a normal mode. In the high sensitivity mode, a touch (mere contact) is detected more easily, so that a touch operation such as a tap operation is detected more easily. The processor 200 judges that the touch panel 103 has been touched if an amount of change in the electrostatic capacitance detected by the touch panel control circuit 209 is greater than the setup value for determining that a touch has been made. Letting the setup value for determining that a touch has been made in the high sensitivity mode be a "second threshold" and a setup value for determining that a touch has been made in the normal mode be a "third threshold", second threshold<first threshold<third threshold.

Although whether an amount of change in electrostatic capacitance in a touch operation is greater than the setup value for determining that a touch has been made is judged by the processor 200, it may be judged by the touch panel control circuit 209.

In the mobile phone 100, the display 102 and the touch panel 103 are powered off automatically after a lapse of a predetermined period of time (for example, 15 seconds) in which no operation has been made.

The proximity sensor 107 includes a light emitting element (not shown) such as an infrared LED and a light receiving element (not shown) such as a photodiode. The processor 200 can calculate a distance between the proximity sensor 107 and an object proximate to the proximity sensor 107 (such as the face or cloth of the user proximate to the mobile phone 100) from a change in output of the photodiode. Specifically, the light emitting element emits infrared rays, and the light receiving element receives the infrared rays reflected off an object such as the face. For example, if the light receiving element is far from the user's face, the infrared rays emitted from the light emitting element are hardly received by the light receiving element.

In contrast, if the user's face is proximate to the proximity sensor 107, the infrared rays emitted from the light emitting element are reflected off the face and received by the light receiving element. In this manner, the amount of infrared rays received by light receiving element varies between the case in which the proximity sensor 107 is proximate to the user's face and in the other case. This enables the processor 200 to calculate the distance between the proximity sensor 107 and the object based on the amount of the light received. The processor 200 then judges that an object is proximate to the proximity sensor 107 when the calculated distance is smaller than a certain value. The proximity sensor 107 is used to detect whether an object is proximate thereto, so it is also referred to as a proximity detector.

The illumination sensor 108 includes photodiodes integrated in array. Upon receipt of light, each photodiode changes its output. The processor 200 can detect the ambient brightness (illumination) of the mobile phone 100 based on a change in output of each photodiode. In another embodiment, phototransistors may be used in place of photodiodes. The illumination sensor 108 is used to detect the ambient illumination, so it is also referred to as an illumination detector.

The vibrator 210 is a motor with an eccentric weight attached to its rotating shaft and is turned on and/or off by the processor 200. When the vibrator 210 operates (turns on), the mobile phone 100 also vibrates due to the vibrations of the vibrator 210. For example, operating the vibrator 210 upon receipt of an incoming call can notify the user of an incoming call state. Operating the vibrator 210 upon detection of a touch operation can notify the user that a touch operation has been detected.

The power supply circuit 211 comprises an IC for power supply management. The power supply circuit 211 can supply the entire system with the power that is based on the voltage across the secondary battery 212. The state in which the power supply circuit 211 is supplying power to the entire system is referred to as a power-on state. In contrast, the state in which the power supply circuit 211 is supplying no power to the entire system is referred to as a power-off state. As described above, the power supply circuit 211 is activated upon long press of the power supply key 106b in the power-off state (power-on operation) and is stopped upon long press of the power supply key 106b in the power-on state (power-off operation). Further, the power supply circuit 211 includes an external power supply connector (not shown) connected with an external power supply, and accordingly, even in the power-off state, the power supply circuit 211 is activated when power is supplied to the secondary battery 212 (the secondary battery 212 is charged) and is stopped when the fully charged state of the secondary battery 212 is detected. "Being charged" means that the external power supply connector is connected with the external power supply and receives a power supply from the external power supply, and the secondary battery 212 stores electrical energy. The power supply circuit 211 and the secondary battery 212 may be collectively referred to as a power supply unit.

<Process of Scaling Display Size Up and Down>

The process of scaling up and down a display size of the information displayed on the display 102 will now be described. When accepting a predetermined operation by the user while displaying predetermined information on the display 102, the processor 200 can change the display size of the predetermined information displayed on the display 102. Specifically, the processor 200 can scale up or down the display size of the information displayed on the display 102 and display the information.

Figure 3:
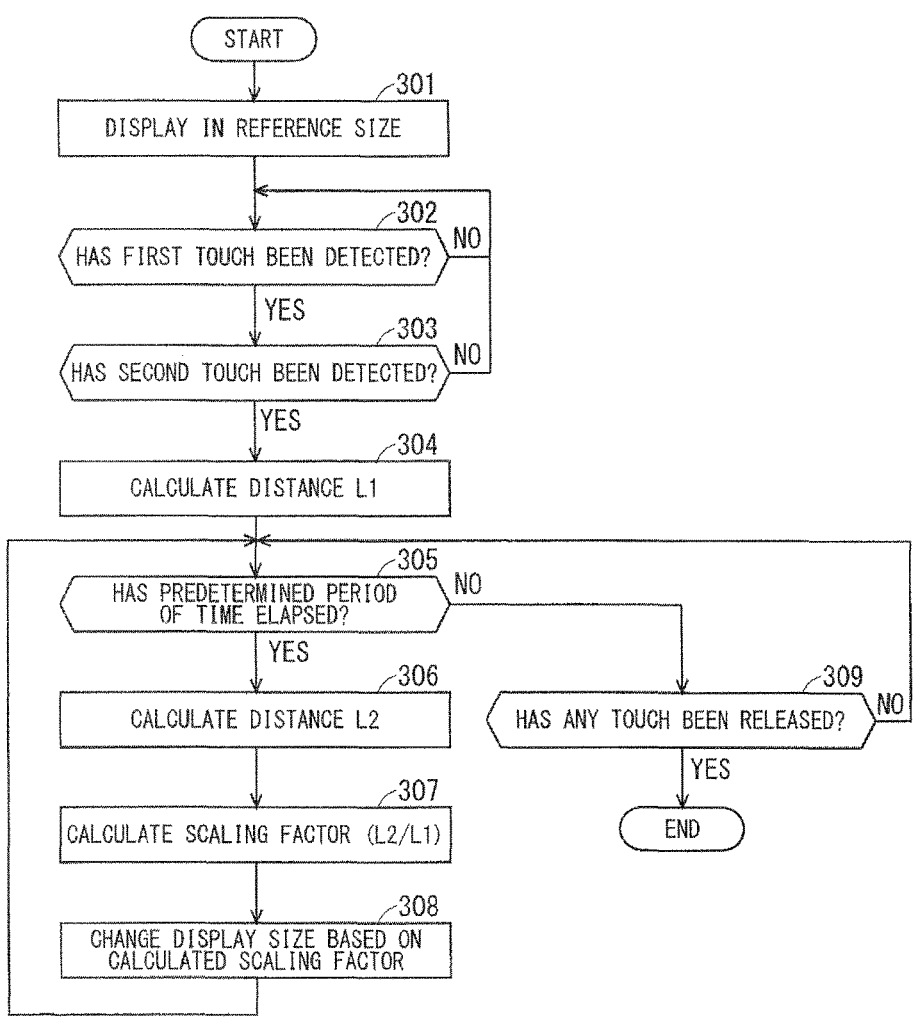
FIG. 3 illustrates a flowchart for explaining an example of a scale-up process and a scale-down process executed by a processor.

FIG. 3 illustrates an example process performed when the processor 200 changes the display size of the information displayed on the display 102.

The processor 200 displays predetermined information on the display 102 in a predetermined display size (S301). The predetermined display size is, for example, a size not subjected to scale-up and scale-down and may also be referred to as a reference size. The predetermined information includes, for example, the information about a webpage received via the second wireless communication circuit 202 and the description of a received email. The processor 200 then determines whether a first touch by the user has been detected (S302). If the first touch has been detected (YES in S302), the processor 200 determines whether a second touch different from the first touch has been detected (S303). If the first touch and the second touch have been detected (YES in S302 and YES in S303), the processor 200 calculates the distance between the position of the first touch and the position of the second touch as a first distance (L1) (S304).

After a predetermined period of time elapses (YES in S305) from the calculation of the first distance, the processor 200 again calculates the distance between the position of the first touch and the position of the second touch as a second distance (L2) (S306). Also after calculating the second distance, the processor 200 calculates the distance between the position of the first touch and the position of the second touch every time a predetermined period of time elapses until at least one of the first touch and the second touch is no longer detected (NO in S309), and sets the calculated distance as the second distance. In other words, the second distance is updated every time a predetermined period of time elapses.

When the user performs a touch operation using the first touch in the case where the second touch has not been detected, the processor 200 executes the process corresponding to the touch operation. When the touch operation is, for example, a slide operation, the description displayed on the display 102 is scrolled. Of the first touch and the second touch, when the first touch is no longer detected, the processor 200 may regard the second touch as the first touch and continue the process.

After calculating the second distance, the processor 200 calculates how many times the second distance is compared to the first distance (S307). Specifically, the processor 200 calculates L2/L1. The processor 200 sets the calculated value as a scaling factor. The processor 200 changes the display size of the information displayed on the display 102 based on the set scaling factor (S308). The processor 200 can thus change the display size. The display size is scaled up if the L2/L1 value is greater than "1", or the display size is scaled down if the L2/L1 value is smaller than "1".

The method of scaling a display size up and down is not limited to the method described above. For example, the display size may be scaled up at a first scaling factor every time the user's touch operation draws a first path, and the display size may be scaled down at a second scaling factor every time the user's touch operation draws a second path. For example, when the first path is a path drawing a circle clockwise and the second path is a path drawing a circle counterclockwise, the processor 200 may scale the display size up by, for example, 1.2 times every time it detects a path of a circle drawn clockwise and scale the display size down by, for example, 0.8 times every time it detects a path of a circle drawn counterclockwise. The scaling factors of 1.2 times and 0.8 times are merely examples, and other scaling factors may be used. The path may be a non-circular path.

The method of scaling a display size up and down is not limited to the method described above. For example, the mobile phone 100 may store a plurality of display sizes in advance so that the user selects an appropriate display size from the stored display sizes. In this case, the processor 200 displays information on the display 102 again based on the display size selected by the user. Specifically, the processor 200 can store the display sizes of 0.5, 0.8, 1.0, 1.5, and 2.0 times. The processor 200 scales up the information displayed on the display 102 by 2.0 times and displays the information when the user selects "2.0 times", or scales down the information displayed on the display 102 by 0.5 times and displays the information when the user selects "0.5 times". The display sizes stored in advance in the mobile phone 100 are not limited to 0.5, 0.8, 1.0, 1.5, and 2.0 times. The mobile phone 100 may store other scaling factors.

In one embodiment, the operation of increasing a display size based on the user's operation, or, scaling up the information displayed on the display 102 and displaying the information is merely referred to as a scale-up operation, and the operation of reducing a display size based on the user's operation, or, scaling down the information displayed on the display 102 and displaying the information is merely referred to as a scale-down operation.

<Process of Disabling Link>

Description will now be given of the process of disabling a user's operation performed on the link information, which accompanies the scale-up operation and the scale-down operation for a display size.

Figure 4:
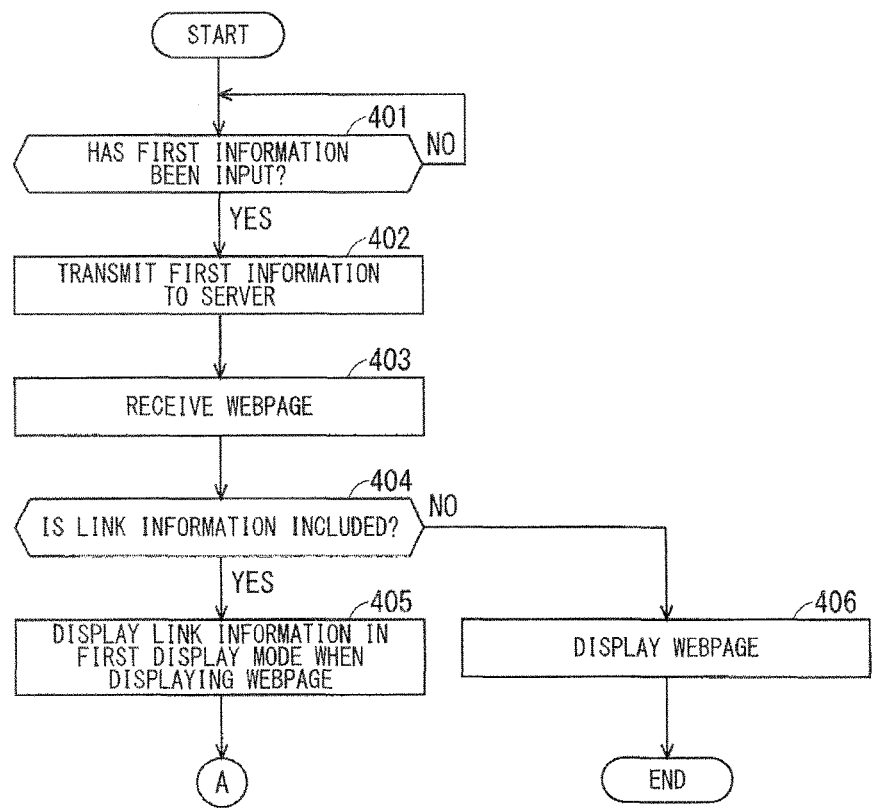
FIG. 4 illustrates a flowchart for explaining an example process until the mobile phone displays a webpage.
Figure 5:
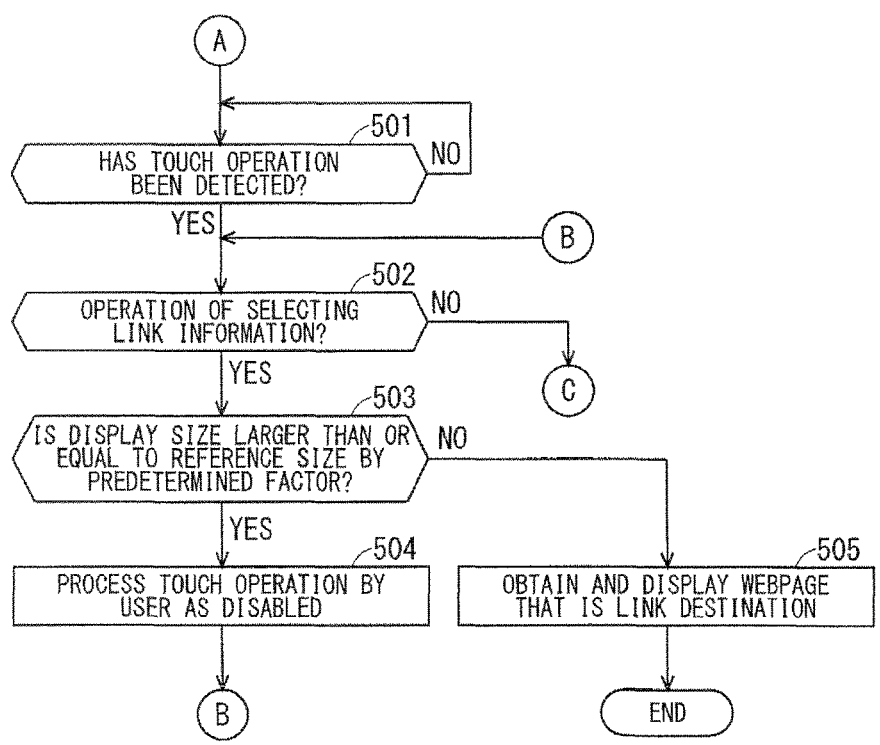
FIG. 5 illustrates a flowchart for explaining an example process of disabling an operation of selecting link information executed by the processor.
Figure 6:
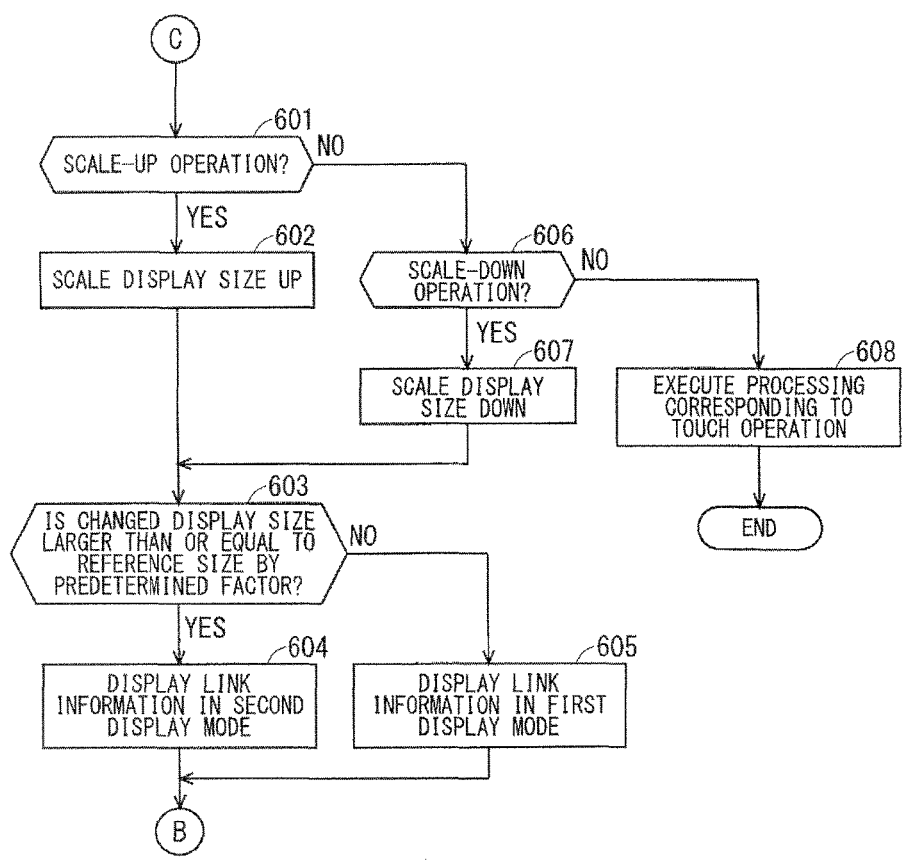
FIG. 6 illustrates a flowchart for explaining an example process of disabling the operation of selecting link information executed by the processor.

FIGS. 4 to 6 illustrate examples of flowcharts showing the process of disabling the user's operation on the link information, which is performed by the processor 200. FIG. 4 illustrates a flowchart showing the process from the reception to display of a first webpage by the mobile phone 100. FIGS. 5 and 6 illustrate flowcharts showing the process of disabling the user's operation on the link information.

If the user inputs information about the first webpage (YES in S401), the processor 200 transmits the information to the server via the second wireless communication circuit 202 (S402). The processor 200 then receives information about the first webpage via the second wireless communication circuit 202 (S403).

The processor 200 judges whether the first webpage includes a portion to which link information is put (S404). The link information is, for example, URL. If judging that the first webpage includes a portion to which link information is put (YES in S404), when displaying the first webpage including the portion to which the link information is put on the display 102, the processor 200 displays the first webpage in a first display mode in which the relevant portion is distinguishable from other portions (S405). The first display mode is a mode in which, for example, if the relevant portion is a text, the text is underlined or is displayed in a color different from that of the other text. After executing the process of S405, the processor 200 proceeds to S501 of FIG. 5 (S405→A).

If judging that the first webpage includes no portion to which link information is put (NO in S404), the processor 200 displays the first webpage as it is.

Figure 7A:
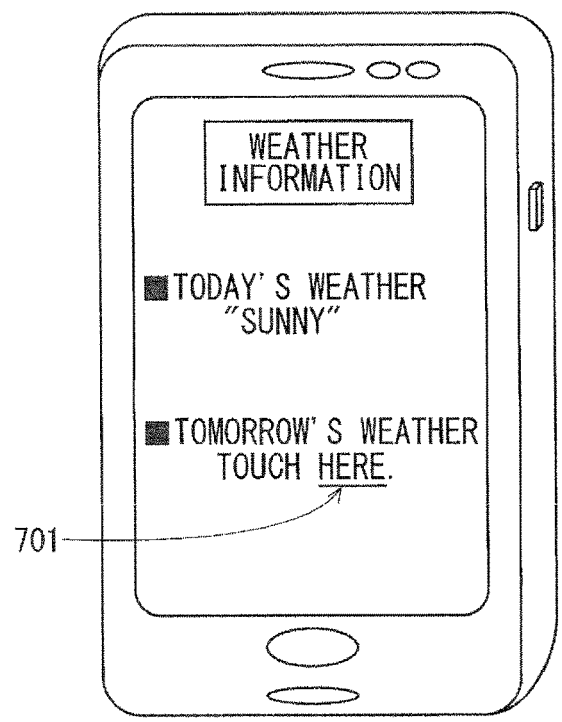
FIGS. 7A and 7B each illustrates an example webpage displayed on a display.

FIG. 7A illustrates an example in which a first webpage including link information is displayed on the display 102. With reference to FIG. 7A, the link information is put to a text 701 of "HERE". The text 701 of "HERE" is thus underlined (first display mode) to be distinguishable from any other text. Although a webpage related to weather information is used as an example of the first webpage in one embodiment, the first webpage is not necessarily limited to a webpage related to weather information. Any other webpage may be used.

Description will now be given of the process of disabling the user's operation on the link information with reference to FIGS. 5 and 6.

The processor 200 detects whether the user has performed a touch operation (S501). If detecting that the user has performed a touch operation (YES in S501), the processor 200 judges whether the relevant operation is an operation of selecting link information (S502).

The operation of selecting link information means that, for example, the user performs a tap operation within the region in which the link information is displayed. For example, when the user performs a tap operation on the region in which "HERE" is displayed in FIG. 7A, the processor 200 judges that the relevant operation is an operation of selecting the portion to which the link information is put, or, the text 701. The operation of selecting the link information is not limited to the tap operation. The slide operation, the flick operation, or any other operation may be used in place of the tap operation.

If the touch operation by the user is an operation of selecting the link information (YES in S502), the processor 200 judges whether the display size of the first webpage displayed on the display 102 is larger than or equal to a reference size by a predetermined factor (S503). The predetermine factor may be 1.5 or 2.0 times the reference size, or an appropriate predetermined factor may be set.

If the display size is not larger than or equal to the reference size by the predetermined factor (NO in S503), the processor 200 obtains a webpage that is a link destination associated with the link information and displays the obtained webpage on the display 102 (S505).

In contrast, if the display size is larger than or equal to the reference size by the predetermined factor (YES in S503), the processor 200 disables the touch operation by the user (S504). The processor 200 does not display the information on the link destination based on the user's touch operation.

Next, if the touch operation by the user is not the operation of selecting the link information (NO in S502), the processor 200 judges whether the relevant touch operation is a scale-up operation (S601).

If the relevant touch operation is the scale-up operation (YES in S601), the processor 200 scales the display size of the webpage up based on the scale-up operation (S602). The processor 200 then judges whether the display size after the scale-up is larger than or equal to the reference size by the predetermined factor (S603). If the display size is not larger than or equal to the reference size by the predetermined factor (NO in S603), the processor 200 displays the link information in the first display mode (S605). If the display size is larger than or equal to the reference size by the predetermined factor (YES in S603), the processor 200 displays the link information in a second display mode different from the first display mode (S604). The second display mode will be described below.

If the touch operation by the user is not the scale-up operation (NO in S601), the processor 200 judges whether the relevant touch operation is the scale-down operation (S606). If the relevant touch operation is the scale-down operation (YES in S606), the processor 200 scales the display size of the webpage down based on the scale-down operation (S607). The processor 200 then judges whether the display size after the scale-down is larger than the reference size by the predetermined factor or more (S603). If the display size is not larger than or equal to the reference size by the predetermined factor (NO in S603), the processor 200 displays the link information in the first display mode (S605). If the display size is larger than or equal to the reference size by the predetermined factor (YES in S603), the processor 200 displays the link information in the second display mode different from the first display mode (S604).

If the touch operation by the user is neither the scale-up operation nor the scale-down operation (NO in S606), the processor 200 executes the process corresponding to the touch operation (S608). For example, when the touch operation is the slide operation, the processor 200 executes the process of scrolling the webpage based on the slide operation.

The process above can avoid a situation in which, if the display size of the link information is scaled up with a scaled-up display size, the webpage that is a link destination associated with the link information is inadvertently displayed at a timing unintended by user.

When the high sensitivity mode is set as described above, a threshold for determining that a touch has been made is set to be low. When the high sensitivity mode is set, thus, a touch or release may be judged even from a small change in electrostatic capacitance. When the display size of the link information is scaled up, a user's finger or the like is more likely to touch the link information. Thus, when the display size is scaled up while the high sensitivity mode is set, a tap operation may be detected at a timing unintended by the user, and accordingly, the webpage that is a link destination associated with the link information may be inadvertently displayed. Also in this case, the process described above can avoid a situation in which the webpage that is a link destination associated with the link information is inadvertently displayed at a timing unintended by the user.

<Specific Action Example>

A specific action example of the process of disabling a link described above will be described with reference to FIGS. 7A to 9B.

Figure 7B:
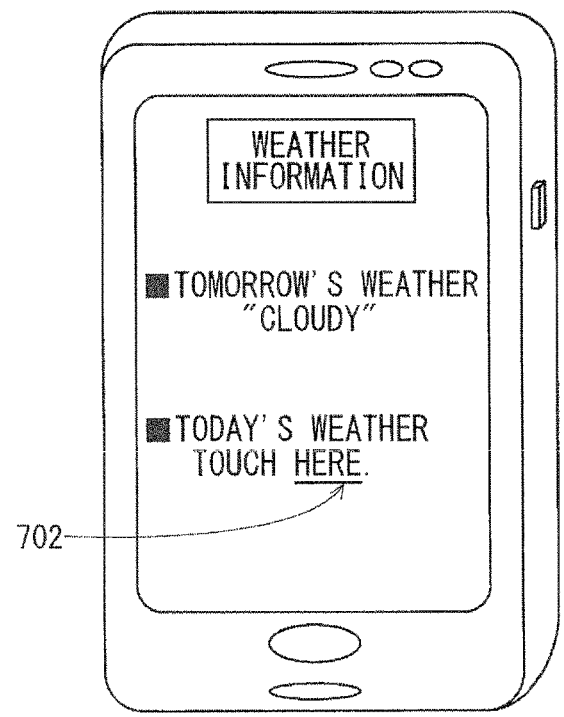

FIGS. 7A and 7B each illustrates an example of the case in which the user performs the operation of selecting link information.

As described above, in FIG. 7A, a webpage related to a weather news is displayed on the display 102 in a reference size. The webpage includes link information, to which the text 701 described as "HERE" in FIG. 7A corresponds. In FIG. 7A, the portion corresponding to the link information, or, the portion described as "HERE" is underlined to be distinguishable from the other information.

When the user performs a tap operation on the text 701, or, when the processor 200 detects a tap operation within the region displayed as "HERE", the mobile phone 100 obtains a webpage that is a link destination associated with the link information and displays the newly obtained webpage on the display 102. FIG. 7B illustrates that a new webpage is displayed by the user performing a tap operation on the portion described as "HERE" in FIG. 7A. A text 702 is link information included in a new webpage.

Figure 8A:
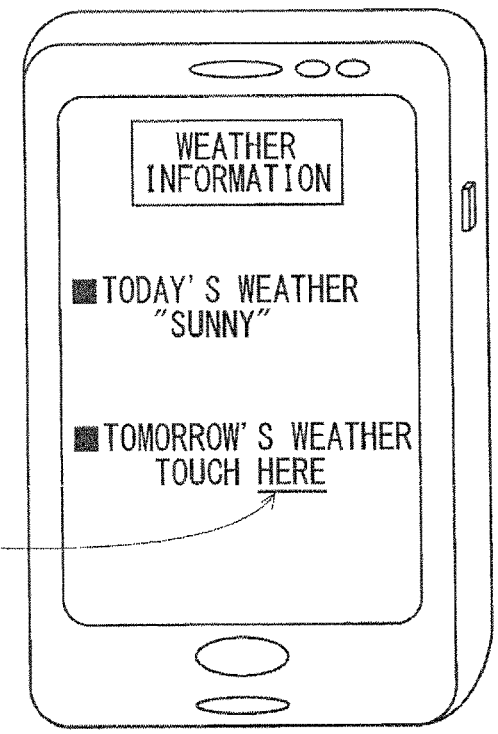
FIGS. 8A to 8C each illustrates an example webpage displayed on the display.
Figure 8B:
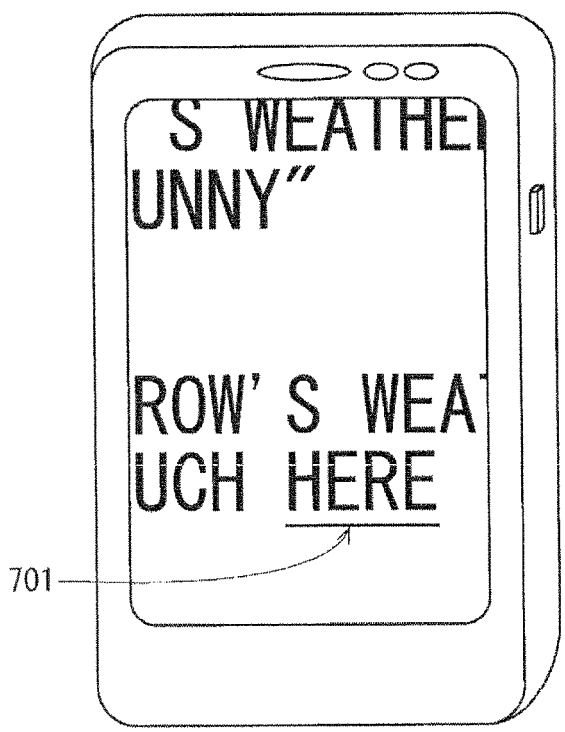
Figure 8C:
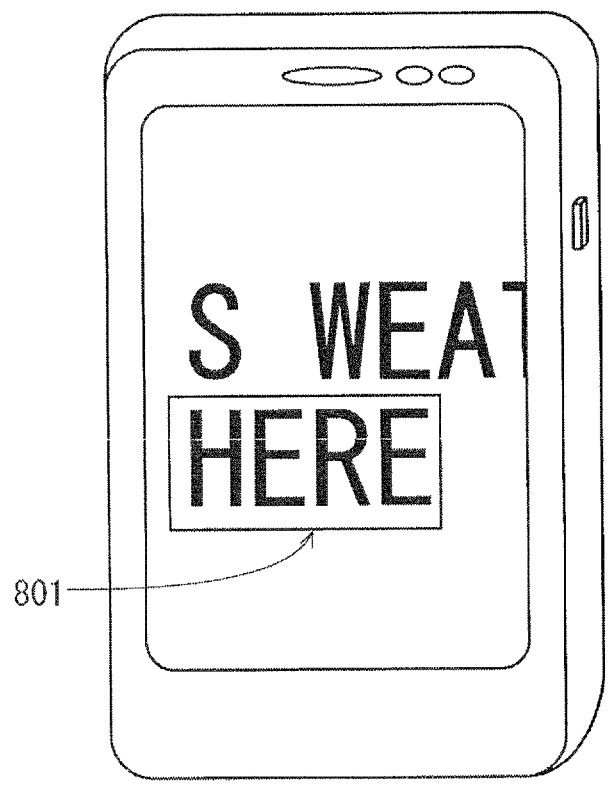

FIGS. 8A to 8C each illustrates an example of the case in which the user performs the scale-up operation.

When the user performs the scale-up operation for a display size in the case of FIG. 8A, the display size of the webpage is scaled up and is displayed as in, for example, FIG. 8B. The display size in FIG. 8B after the scale-up operation is not larger than or equal to the reference size by the predetermined factor. Thus, the portion described as "HERE" in FIG. 8B is displayed in a display mode similar to that of FIG. 8A, or, is underlined. When the user performs a tap operation on the portion displayed as "HERE" in FIGS. 8A and 8B, a new webpage is displayed as illustrated in FIG. 7B.

When the user further performs the scale-up operation for the display size in the case of FIG. 8B, the display size of the webpage is scaled up further and is displayed as in, for example, FIG. 8C. The display size in FIG. 8C is larger than or equal to the reference size by the predetermined factor. Thus, the portion displayed as "HERE" in FIG. 8C is displayed in a display mode different from those of FIGS. 8A and 8B. The portion displayed as "HERE" in FIG. 8C is surrounded by a frame 801. For FIG. 8C, when the user performs a tap operation on the portion displayed as "HERE", the processor 200 processes the tap operation as disabled. Thus, a new webpage is not displayed as in FIG. 7B, and the display of FIG. 8C is kept. Although a frame is added as an example of the second display mode in FIG. 8C, "HERE" may be merely displayed without adding a frame or underline, or, without displaying a text in a distinguishable manner from another text.

Figure 9A:
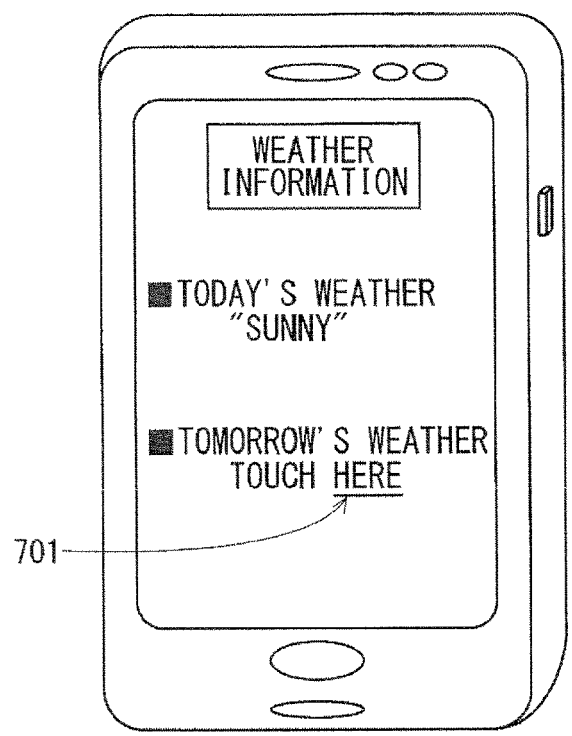
FIGS. 9A and 9B each illustrates an example webpage displayed on the display.
Figure 9B:
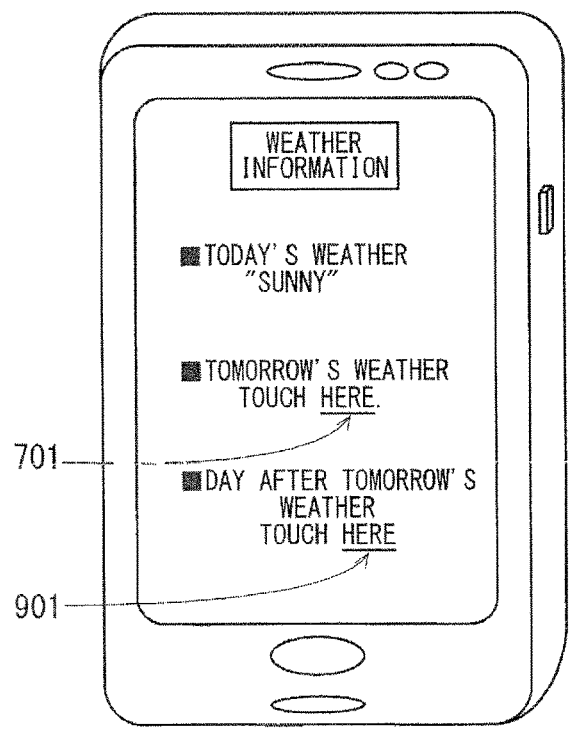

FIGS. 9A and 9B each illustrates an example of the case in which the user performs the scale-down process.

When the user performs the scale-down process for a display size in the case of FIG. 9A, the display shifts to a display as illustrated in, for example, FIG. 9B. The display size in FIG. 9B is smaller than the reference size, and thus, the text 701 that is link information is displayed in the first display mode. A text 901 is link information different from the link information corresponding to the text 701. When the tap operation on the text 701 is detected, the display of FIG. 7B is performed.

<Modifications>

(1) Although one embodiment has described that the operation of selecting link information is disabled when the display size is larger than or equal to the reference size by a predetermined factor irrespective of whether the display mode is the high sensitivity mode or the normal mode, one embodiment is not necessarily limited to this case. The operation of selecting link information may be disabled if the display size is larger than or equal to the reference size by a predetermined factor when the high sensitivity mode is set, and the process of disabling the operation of selecting link information may not be executed when the normal mode is set. The process is accordingly executed when a malfunction tends to occur, thus eliminating the need of the user to pay attention to a display size in the normal mode.

(2) Although it is described in S604 of FIG. 6 that the processor 200 performs a display in the second display mode, one embodiment is not necessarily limited to this case. For example, when the processor 200 keeps the first display mode and the user performs a tap operation on the link information, the processor 200 may notify the user that the operation is disabled in the form of character information or the like. In other words, the processor 200 may notify the user that the operation is disabled by causing the display 102 to display character information or the like. Alternatively, the processor 200 may notify that the operation is disabled by vibrating the mobile phone 100 with the vibrator 201, in place of character information.

(3) The operation of selecting link information is not limited to the tap operation in one embodiment. For example, the operation may be a long tap operation or a flick operation.

(4) Although one embodiment has described that the operation of selecting link information is disabled when the link information is displayed in the second display mode, one embodiment is not necessarily limited to the case in which the operation is disabled. For example, the processor 200 may display the webpage of a link destination if a tap operation is detected for the link information when the link information is displayed in the first display mode, and may display the webpage of a link destination if a long touch operation is detected for the link information when the link information is displayed in the second display mode. In other words, the processor 200 may display the webpage of a link destination upon detection of a first touch operation for the link information when the link information is displayed in the first display mode, and may display the webpage of a link destination upon detection of a second touch operation different from the first touch operation when the link information is displayed in the second display mode. Specifically, when "HERE" is displayed in the second display mode in FIG. 8C, upon detection of an operation different from a tap operation performed on the portion in which "HERE" is displayed, such as a long tap operation or a flick operation, the processor 200 may obtain the webpage of a link destination and display the webpage of the link destination on the display 102 as illustrated in FIG. 7B.

(5) Although one embodiment and the modification (1) above have described that the webpage of a link destination is displayed based on a tap operation when the link information is displayed in the first display mode irrespective of whether the display mode is the normal mode or the high sensitivity mode, one embodiment is not necessarily limited to this case. For example, even when the link information is displayed in the first display mode, the webpage of a link destination may be displayed based on a tap operation in the normal mode, and the webpage of a link destination may be displayed based on an operation different from the tap operation, for example, a long touch operation, a flick operation, or any other operation in the high sensitivity mode.

(6) In the modification (1) combined with the modification (5), the processor 200 may display the webpage of a link destination on the display 102 upon detection of a third operation performed on the link information in the normal mode, display the webpage of a link destination on the display 102 upon detection of a fourth operation when the link information is displayed in the first display mode in the high sensitivity mode, and display the webpage of a link destination on the display 102 upon detection of a fifth operation when the link information is displayed in the second display mode in the high sensitivity mode.

(7) Although one embodiment has described a webpage as an example, one embodiment is not necessarily targeted for a webpage alone. One embodiment is also applicable to a situation in which a predetermined process, which is associated with a specific text or the like, is executed when a predetermined touch operation is executed on the specific text or the like.

In emails, for example, a specific application program is associated with a specific text. For example, an application program related to a call may be associated with a telephone number, an application program related to an email may be associated with an email address, and an application program related to a calendar may be associated with a date. When the user performs a tap operation or any other operation on a telephone number or the like, an application associated therewith is executed, so that a screen of the executed application program is displayed on the display 102. In this case, if the display size is larger than the reference size by a predetermined factor or more, an application program related to a call ore the like may be configured not to be executed even when the user performs a touch operation on the telephone number or the like.

One embodiment is also applicable to the case in which the functions and application programs of the mobile phone 100 are searched for. As a result of the search, a list of the names of the application programs and the names of the functions may be displayed as search results. When the user performs a touch operation on any one of the search results, the application program corresponding to the name of the application program on which the touch operation has been performed may be executed, or the setup screen of a function corresponding to the name of the function on which a touch operation has been performed may be displayed. In this case, if the display size is larger than the reference size by a predetermined factor or more, even when the user performs a touch operation on the search result, the application corresponding to the name of the application on which the touch operation has been performed may be configured not to be executed, or a setup screen of a function corresponding to the name of the function on which the touch operation has been performed may be configured not to be displayed.

One embodiment is also applicable to the case in which the information containing, as at least a part thereof, a specific text associated with a predetermined process is displayed.

(8) Although one embodiment has given the description using a specific text as the link information and the modifications have given the description assuming that a predetermined process is associated with a specific text, one embodiment is not necessarily limited to a text. A predetermined process may not be associated with a specific text, for example, may be associated with an image including no text, or the image may be included as the link information. A text and an image may be combined, or an image may include a text.

Although the examples above have described, as an example, the case in which one embodiment is applied to the mobile phone 100, for example, a smartphone, one embodiment is also applicable to any other mobile electronic apparatus that includes the touch panel 103 and can obtain and display a webpage. For example, one embodiment is also applicable to, for example, personal computers, tablet devices, and wearable mobile electronic apparatuses worn in the arm or the like.

While the mobile electronic apparatus 100 has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

What is claimed is:

1. A mobile electronic apparatus capable of displaying a first webpage and a second webpage, the apparatus comprising:
   a wireless communication circuit configured to receive the second webpage, wherein the second webpage contains information including a link destination indicating the first webpage;
   a display device configured to display the second webpage;
   a touch sensor configured to detect a touch operation of a user on the display device; and
   at least one processor configured to
      change a display size of the information contained in the second webpage displayed on the display device based on a first touch operation by the user,
      display the first webpage on the display device upon detection of a second touch operation performed on the link destination displayed on the display device when the information contained in the second webpage is displayed in a first display size, and not display the first webpage on the display device upon detection of the second touch operation performed on the link destination displayed on the display device when the information contained in the second webpage is displayed in a second display size larger than the first display size.

2. The mobile electronic apparatus according to claim 1, wherein when displaying the link destination on the display device, the at least one processor displays the link destination in a first display mode on the display device in the first display size, and displays the link destination in a second display mode different from the first display mode in the second display size.

3. The mobile electronic apparatus according to claim 2, wherein the at least one processor displays the first webpage on the display device upon detection of a third touch operation performed on the link destination when the link destination is displayed in the second display size.

4. The mobile electronic apparatus according to claim 1, wherein during display of the second webpage in the second display size, the at least one processor disables a touch operation on the link destination.

5. The mobile electronic apparatus according to claim 1, wherein the at least one processor provides a predetermined notification when disabling the second touch operation.

6. The mobile electronic apparatus according to claim 5, wherein the at least one processor causes the display device to display a predetermined message as the predetermined notification.

7. The mobile electronic apparatus according to claim 5, further comprising a vibrator configured to vibrate,
wherein the at least one processor causes the vibrator to vibrate as the predetermined notification.

8. The mobile electronic apparatus according to claim 1, wherein
the first touch operation comprises an operation of drawing, after detection of a touch performed by the user, a predetermined path using the touch,
the at least one processor displays the second webpage in the second display size upon detection of the predetermined path when the second webpage is displayed in the first display size.

9. The mobile electronic apparatus according to claim 1, wherein
the first touch operation comprises a first touch and a second touch performed by the user, wherein the first touch operation causes an increase of a distance between a position of the first touch and a position of the second touch, and
the at least one processor displays the second webpage in the second display size upon increase of the distance when the second webpage is displayed in the first display size.

10. A mobile electronic apparatus comprising:
a storage configured to store first information and a predetermined process in association with each other;
a display device configured to display second information including the first information;
a touch sensor configured to detect a touch operation of a user performed on the display device; and
at least one processor configured to
change a display size of the second information displayed on the display device based on a first touch operation by the user,
execute the predetermined process upon detection of a second touch operation performed on the first information displayed on the display device when the second information is displayed in a first display size, and not execute the predetermined process upon detection of the second touch operation performed on the first information displayed on the display device when the second information is displayed in a second display size larger than the first display size.

11. The mobile electronic apparatus according to claim 10, wherein when displaying the first information on the display device, the at least one processor displays the first information in a first mode on the display device in the first display size, and displays the first information in a second mode different from the first mode in the second display size.

12. The mobile electronic apparatus according to claim 11, wherein the at least one processor executes the predetermined process upon detection of a third touch operation performed on the first information when the first information is displayed in the second display size and in the second display mode.

13. The mobile electronic apparatus according to claim 10, wherein during display of the information in the second display size, the at least one processor disables a touch operation on the first information.

14. The mobile electronic apparatus according to claim 10, wherein the at least one processor provides a predetermined notification when disabling the second touch operation.

15. The mobile electronic apparatus according to claim 14, wherein the at least one processor causes the display device to display a predetermined message as the predetermined notification.

16. The mobile electronic apparatus according to claim 14, further comprising a vibrator configured to vibrate,
wherein the at least one processor causes the vibrator to vibrate as the predetermined notification.

17. The mobile electronic apparatus according to claim 10, wherein
the first touch operation comprises an operation of drawing, after detection of a touch performed by the user, a predetermined path using the touch, and
the at least one processor displays the second information in the second display size upon detection of the predetermined path when the second information is displayed in the first display size.

18. The mobile electronic apparatus according to claim 10, wherein
the first touch operation comprises a first touch and a second touch performed by the user, wherein the first touch operation causes an increase of a distance between a position of the first touch and a position of the second touch, and
the at least one processor displays the second information in the second display size upon increase of the distance when the second information is displayed in the first display size.

19. A display method comprising:
displaying first information including second information on a display device, wherein the second information and a predetermined process are in association with each other;
detecting a touch operation of a user performed on the display device;
changing a display size of the first information displayed on the display device based on a first touch operation by the user,
executing the predetermined process upon detection of a second touch operation performed on the second information displayed on the display device when the first information is displayed in a first display size, and not executing the predetermined process upon detection of the second touch operation performed on the second information displayed on the display device when the first information is displayed in a second display size larger than the first display size.

* * * * *